(12) United States Patent
Berger et al.

(10) Patent No.: US 7,019,903 B2
(45) Date of Patent: Mar. 28, 2006

(54) COLOR DICHROIC POLARIZERS AND METHOD FOR THE PRODUCTION THEREOF

(75) Inventors: Andreas Berger, Carl-von-Ossietzky-Strasse 22, 06114 Halle (DE); Wolf-Gernot Drost, Lortzingbogen 29, 06124 Halle (DE); Lutz Gaudig, Halle (DE); Siegfried Panzer, Dresden (DE); Rainer Bartel, Dresden (DE); Jürgen Dänhardt, Dresden (DE)

(73) Assignees: Andreas Berger, Halle (DE); Wolf-Gernot Drost, Halle (DE)

( * ) Notice: Subject to any disclaimer, the term of this patent is extended or adjusted under 35 U.S.C. 154(b) by 158 days.

(21) Appl. No.: 10/471,755

(22) PCT Filed: Mar. 14, 2002

(86) PCT No.: PCT/DE02/00913

§ 371 (c)(1),
(2), (4) Date: Sep. 26, 2003

(87) PCT Pub. No.: WO02/077679

PCT Pub. Date: Oct. 3, 2002

(65) Prior Publication Data

US 2004/0095644 A1    May 20, 2004

(30) Foreign Application Priority Data

Mar. 26, 2001 (DE) ............... 101 14 815

(51) Int. Cl.
*G02B 27/28* (2006.01)
*G02B 5/30* (2006.01)

(52) U.S. Cl. ............... 359/492; 359/490; 359/485

(58) Field of Classification Search ........ 359/490–492, 359/483, 485, 900; 65/17.3
See application file for complete search history.

(56) References Cited

U.S. PATENT DOCUMENTS

| 3,653,863 | A | | 4/1972 | Araujo et al. |
| 4,304,584 | A | | 12/1981 | Borrelli et al. |
| 4,486,213 | A | | 12/1984 | Lentz et al. |
| 5,122,907 | A | | 6/1992 | Slocum |
| 5,886,820 | A | * | 3/1999 | Tajima et al. ............... 359/492 |
| 5,999,315 | A | * | 12/1999 | Fukano et al. ............... 359/492 |
| 6,251,297 | B1 | | 6/2001 | Komuro et al. |

FOREIGN PATENT DOCUMENTS

| DE | 2927230 | 1/1981 |
| DE | 19642116 | 4/1998 |

(Continued)

OTHER PUBLICATIONS

NanoStructured Materials, vol. 12, pp. 207-210, XP004176974, 1999, by H. Hofmeister et al.

(Continued)

*Primary Examiner*—Leonidas Boutsikaris
(74) *Attorney, Agent, or Firm*—Greenblum & Bernstein, P.L.C.

(57) ABSTRACT

Color dichroic polarizer includes a glass substrate, a surface layer, and non-spherical metal particles arranged in the surface layer and being deposited in an oriented arrangement. Wherein, in at least one lateral region of the glass substrate, the surface layer comprises a double layer whose two partial layers contain metal particles with different average axis ratios, whereby the two partial layers have different absorption spectra. This Abstract is not intended to define the invention disclosed in the specification, nor intended to limit the scope of the invention in any way.

38 Claims, 5 Drawing Sheets

FOREIGN PATENT DOCUMENTS

| | | |
|---|---|---|
| DE | 19829970 | 1/2000 |
| EP | 0521591 | 1/1993 |
| EP | 0860718 | 8/1998 |
| JP | 11-64631 | 3/1999 |
| JP | 11183727 | 7/1999 |

OTHER PUBLICATIONS

English Language Abstract of JP 11-183727.
English Language Abstract of JP 11-64631.

\* cited by examiner

COLOR DICHROIC POLARIZERS AND METHOD FOR THE PRODUCTION THEREOF

CROSS-REFERENCE TO RELATED APPLICATIONS

The present application is a National Stage Application of International Application No. PCT/DE02/00913, filed Mar. 14, 2002. Further, the present application claims priority under 35 U.S.C. § 119 of German Patent Application No. 101 14815.1 filed on Mar. 26, 2001.

BACKGROUND OF THE INVENTION

1. Field of the Invention

The invention relates to color, preferably multicolor, dichroic polarizers and a method for their production. In this type of polarizers the color- and polarizing effect is produced by the dichroic absorption of non-spherical particles, chiefly metallic particles, deposited in glass as a substrate material. The invention relates to the forms of the particles in the substrate material and thus to the form and spectral site of the absorption bands, as well as to a method for the adjustment of the same.

2. Discussion of Background Information

The field of use of the invention is polarizers in the visible, ultraviolet and near infrared spectral region preferably with dichroic absorption bands laterally differently adjusted in a specific manner. Such polarizers are suitable, i.a., for the production of displays.

It is known that uniformly oriented non-spherical particles in substrate materials can lead to dichroic absorption bands. Typical examples are silver, copper, or gold particles in glasses. Oriented spheroid metallic silver particles lead, e.g., in glasses to dichroic absorption bands in the visible, ultraviolet and near infrared spectral region. In the visible spectral region, the dichroic absorption causes a color effect that is dependent on the polarizing direction. In the case of silver particles, it is characteristic thereby that the dichroic behavior is produced by a single absorption band. The absorption band in the visible spectral region can be placed in principle at different points of the visible spectrum, by means of which various color effects can be adjusted. The site of the absorption band maximum in the spectrum is essentially determined thereby by the form of the particles. In the case of ellipsoid particles, the spectral site of the absorption band is determined by the semiaxis ratio of the particles.

There are numerous suggestions that utilize this effect for special applications.

A method for the production of a dichroic polarizer for liquid crystal displays is known from DE 29 27 230 C2 "Method for the production of a polarized glass film, glass film produced accordingly, and use of such a film in liquid crystal displays". The starting point is an organic or inorganic glass melt into which needle-shaped bodies are introduced and from which a glass film is drawn.

It is known to produce highly polarizing glasses on the basis of phase-separated silver halide-containing glasses in which silver halide particles of the desired size are produced by tempering (U.S. Pat. No. 3,653,863). This is followed by two further steps: First the glass is stretched, extruded, or rolled at temperatures between the upper cooling point and the glass transition temperature in order to endow the silver halide particles with an ellipsoid shape and to orient them in the same direction. Then the glass is exposed to a radiation, e.g., UV radiation. Metallic silver is deposited on the surface of the silver halide particles thereby. These glasses can be adjusted between clear unpolarized and darkened-polarizing, by irradiation.

Furthermore, it is known to temper glass below the cooling point in a reducing atmosphere in order to produce elongated silver particles in a surface layer of the glass of at least 10 µm thickness (U.S. Pat. No. 4,304,584). The production of a glass combined to create a laminate, whereby polarizing and photochromic glass layers are combined and laminated, is described there.

It is known to laminate a metal halide-containing glass with another glass before the deformation process, in order to achieve higher eccentricities of the metal particles (U.S. Pat. No. 4,486,213).

It is known to produce UV polarizers in that the formation of metal particles occurs in a surface layer of glasses by means of a repeated change in the introduction of metal ions and tempering (DE 198 29 970). The result of this is the formation of spherical particles with a certain size distribution. With a subsequent deformation of the glass, spheroid particles of differing size with differing semiaxis ratios are formed.

These methods have in common that submicroscopic, as a rule spherical, foreign phase particles are produced in a substrate matrix, which particles are subsequently deformed in a deformation process and are oriented uniformly in a preferred direction. The resulting dichroic absorption bands of the deformed foreign phase particles are essentially determined by their form and are thus fixed.

Furthermore, it is known that when the substrates are warmed to temperatures near to or above the transformation temperature of the glass, a relaxation of the particles back to the spherical shape occurs. A change in the dichroic absorption is associated with this. Depending on the temperature and duration of their treatment, particles with any desired degree of relaxation between the starting condition and spherical form can be produced. However, the tempering process, whose duration is usually in the range of hours, allows only the monochromatic adjustment of dichroic polarizing glasses to certain colors.

It is known to shorten the relaxation times for the transition of the metal particles from one semiaxis ratio to a smaller one, down to the microsecond range, by using temperatures considerably above the transformation point of the glass (DE 196 42 116). The energy transfer occurs in a structured manner with electron beams. The method additionally allows the absorption band and thus the color effect to be adjusted differently in a specific manner in different lateral regions of the substrate. In this manner flat elements of different colors with lateral dimensions down to far below 100 µm can also be produced.

The principal deficiency of the prior art is that the absorption bands that can be produced, in the case of silver a single band, are always fixed on the band form, which is determined by the form of the particles. More complex band forms cannot be produced.

If it is desired to produce full color by additive color mixing of the primary colors red, green, and blue, however, specific demands must be made on the absorption spectra that cannot be met by the prior art. In order to obtain one of the three primary colors when illuminated by daylight, the two other primary colors must respectively be strongly absorbed. In order, for example, to obtain the colors red or blue respectively when illuminated by daylight, broad absorption bands are required that absorb in the blue and green or red and green spectral region respectively. In order to obtain green, two absorption bands with maxima in the red and blue spectral region are necessary. This lies outside the possibilities offered by the prior art.

For use of the dichroic polarizers for color displays, however, it would be necessary to arrange for small regions with such absorption bands to be closely adjacent, in order to make an additive mixture of the primary colors physiologically effective for the observer.

SUMMARY OF THE INVENTION

The invention aims to create a multicolor dichroic polarizer that contains closely adjacent flat regions, such as e.g. strips or pixels, in a lateral arrangement, which regions differ in the spectral site of their absorption bands and are preferably adjusted in the colors red, green, and blue. Furthermore the invention also provides for a method that allows the absorption bands required for this to be produced in dichroic polarizing glass.

It is assumed that it is possible to produce almost any desired absorption spectra by superimposing different absorption bands. The superimposition of the absorption bands can be attained by arranging partial layers with absorption bands in different spectral regions one behind the other. Parallax freedom is required for the production of desired absorption spectra on very small areas, i.e., for example, pixel structures. For this it is necessary for the partial layers lying one behind the other to be in as dense an arrangement as possible.

This dense arrangement is made possible according to the invention in that the absorbing layer is formed as at least a double layer whose two partial layers feature different absorption bands. The color dichroic polarizer constructed on this principle preferably comprises a known sodium silicate glass substrate that is provided at least partially with a double layer containing non-spherical metal particles, in particular silver particles. Their average axis ratio within one of the two partial layers of the double layer differs from the average axis ratio within the respective other of the two partial layers of the double layer. The two partial layers are thus characterized by different absorption spectra, in the case of silver particles by different single bands. The resulting absorption spectrum is thus formed from the superimposition of the absorption bands of a different spectral site of the two partial layers of the double layer lying one behind the other. In this manner colors can be displayed that can be produced only by multiband absorption spectra. If small adjacent regions are treated so that different, preferably multiband, absorption spectra form in them, the colors resulting from the different absorption spectra can be mixed additively.

In one embodiment as a multicolor dichroic polarizer, preferably three different resulting absorption spectra are achieved in this manner in different lateral regions of the double layer, in that two single bands respectively are combined or superimposed by suitable adjustment of the absorption by lateral regions of the partial layers of the double layer. These lateral regions are grouped in a regular arrangement of strips or pixels. Three of these lateral regions respectively, which by suitable adjustment of the absorption bands of the partial layers of the double layer appear in the colors red, green, and blue when illuminated with white light, are grouped to produce a flat element that can accept each such displayable color by additive color mixing. Whereas in the red and blue strips or pixels the axis ratios of the metal particles in the two partial layers of the double layer are adjusted so that they feature adjacent absorption bands lying in the blue and green or red and green region respectively, in the green regions the axis ratio of the metal particles in the two partial layers of the double layer respectively is adjusted so that they absorb in the blue or red spectral region. Thus in these lateral regions an absorption spectrum with two separate maxima in the red and blue spectral region is formed, so that only the green component of the light can transit these lateral regions of the substrate. It is only the production of such absorption spectra with absorption maxima lying far apart from one another and an adequate optical density that enables the preparation of all three additive primary colors and is a prerequisite for the full color ability of the dichroic polarizer according to the invention. Mixed colors of high saturation can be produced in particular at an optical density of the individual partial layers of $\geq 1$ in the range of the respective absorption maxima.

The method for the production of the dichroic polarizers begins in a known manner first with the production of a surface layer in glass substrates, preferably sodium silicate glass substrates, which layer contains non-spherical metal particles, preferably silver particles, with an adequately large axis ratio in the required density and oriented arrangement. The main process steps required for this are according to prior art ion exchange, tempering, and deformation. The adjustment of lateral surface regions to certain absorption bands occurs in a known manner by quasi-adiabatic warming of the respective surface region over at least the thickness of the surface layer containing the metal particles by the appropriate action of an electron beam on the substrate.

To adjust different axis ratios of the metal particles in the surface regions that are to be formed as a double layer, according to the invention the corresponding surface regions are exposed to the brief action of an electron beam, whereby the range of the electrons in the substrate material is preferably selected by way of an appropriate accelerating voltage of the electron beam such that the temperature needed for the desired relaxation of the metal particles is achieved only in the upper partial layer of the double layer, while in the lower partial layer of the double layer the metal particles essentially remain in their initial shape. It is advisable if the relaxation of the metal particles is enabled directly in the partial layer bordering on the surface. It has proved to be particularly favorable to select the accelerating voltage of the electron beam so that the electron range in the substrate material is between two and three times the thickness of the upper partial layer of the double layer to be produced.

The invention also provides for a color dichroic polarizer comprising a glass substrate, a surface layer, and non-spherical metal particles arranged in the surface layer and being deposited in an oriented arrangement. In at least one lateral region of the glass substrate, the surface layer comprises a double layer whose two partial layers contain metal particles with different average axis ratios, whereby the two partial layers have different absorption spectra.

The non-spherical metal particles may comprise silver. The surface layer may comprise a regular arrangement of strips. The surface layer may comprise a regular arrangement of pixels. The surface layer may comprise several lateral regions having the same absorption spectrum. The surface layer may comprise strips arranged next to each other in a regular arrangement. Some of the strips may have one absorption spectrum and some other of the strips may have another absorption spectrum. The surface layer may comprise pixels arranged next to each other in a regular arrangement. Some of the pixels may have one absorption spectrum and some other of the pixels may have another absorption spectrum.

The surface layer may comprise three strips arranged to produce an image element. The surface layer may comprise groups of three strips, wherein each group is arranged to produce an image element, and the image elements may form a regular arrangement. The surface layer may comprise three pixels arranged to produce an image element. The surface layer may comprise groups of three pixels, each group may be arranged to produce an image element, and the image elements may form a regular arrangement. The surface layer may comprise a group of one of pixels and strips arranged to produce image elements. The group may comprise three arrangements of pixels or strips, a first arrangement of the group having an absorption maxima in blue and green spectral region, a second arrangement of the group having an absorption maxima in blue and red spectral region, and a third portion of the group having an absorption maxima in the red and green spectral region, whereby, when the strips or pixels are illuminated with linearly polarized white light with a polarizing direction parallel to a large semiaxis of the non-spherical metal particles, the strips or pixels show red, green, and blue colors.

Each of the partial layers may feature an optical density that is greater than or equal to 1. The surface layer may comprise a thickness in the range of between 10 μm and 20 μm. The partial layers may have the same thickness. Each of the partial layers may have a thickness in the range of between 5 μm and 10 μm.

The invention also provides for a process for producing a color dichroic polarizer comprising a glass substrate and a surface layer that contains in an oriented arrangement, non-spherical metal particles and at least not totally relaxed metal particles in individual lateral regions, wherein the process comprises depositing, in an oriented arrangement and in partial regions of the surface layer, the non-spherical metal particles and adjusting an axis ratio of the non-spherical metal particles in one partial layer of the surface layer by briefly warming the non-spherical metal particles, wherein the axis ratio is smaller in the one partial layer than in another partial layer.

The non-spherical metal particles in the individual lateral regions of the surface layer may not adjusted with regard to their axis ratio. The adjusting may comprise causing the non-spherical metal particles to relax. The one partial layer may border on a surface. The brief warming may occur by quasi-adiabatic energy transfer using an electron beam. A depth of penetration of the electron beam may be matched to a thickness of the one partial layer using an accelerating voltage. The accelerating voltage of the electron beam may be selected such that an electron range in the glass substrate is selected between two and three times the thickness of the one partial layer. The quasi-adiabatic energy transfer may occur in several partial amounts as a succession of pulses. The brief warming may occur with an electron beam and an accelerating voltage of the electron beam may be used as a regulating variable in a control process in order to ensure the same optical density of the partial layers. A transferred energy density may be used as a regulating variable in the control process.

The invention also provides for a method of making a color dichroic polarizer comprising providing a glass substrate, applying a surface layer to the glass substrate, wherein the surface layer comprises an outer layer and an inner layer, wherein each of the outer and inner layers comprise a plurality of partial layers and include non-spherical metal particles, and wherein the non-spherical metal particles comprise an average semiaxis ratio that causes an absorption band in a red spectral region, warming an entire thickness of the surface layer until the non-spherical metal particles relax over the entire thickness, whereby the absorption band in the red spectral region shifts to a green spectral region, and warming only the outer layer until (a) an absorption band of one of the partial layers shifts from green to blue, (b) an absorption band of another of the partial layers shifts from red to blue, and (c) an absorption band of still another of the partial layers shifts from red to green.

The warming of the entire thickness may comprise warming with an electron beam by quasi-adiabatic energy transfer using a first accelerating voltage. The warming of only the outer layer may comprise warming with an electron beam by quasi-adiabatic energy transfer using a second accelerating voltage, the second accelerating voltage being lower than the first accelerating voltage. The second accelerating voltage may be in the range of between less than 25 kV and 35 kV and wherein the first accelerating voltage in the range of between 50 kV and 70 kV. The surface layer may comprise a thickness of between 10 μm and 20 μm. Each of the warming stages may occur within a time period of between several microseconds and 10 microseconds. The warming of only the outer layer may comprise warming with an electron beam by quasi-adiabatic energy transfer using an accelerating voltage.

The invention also provides for a color dichroic polarizer made by the process described above.

BRIEF DESCRIPTION OF THE DRAWINGS

The invention is explained in more detail based on an exemplary embodiment and the drawings wherein.

DETAILED DESCRIPTION OF THE INVENTION

Figure 1:
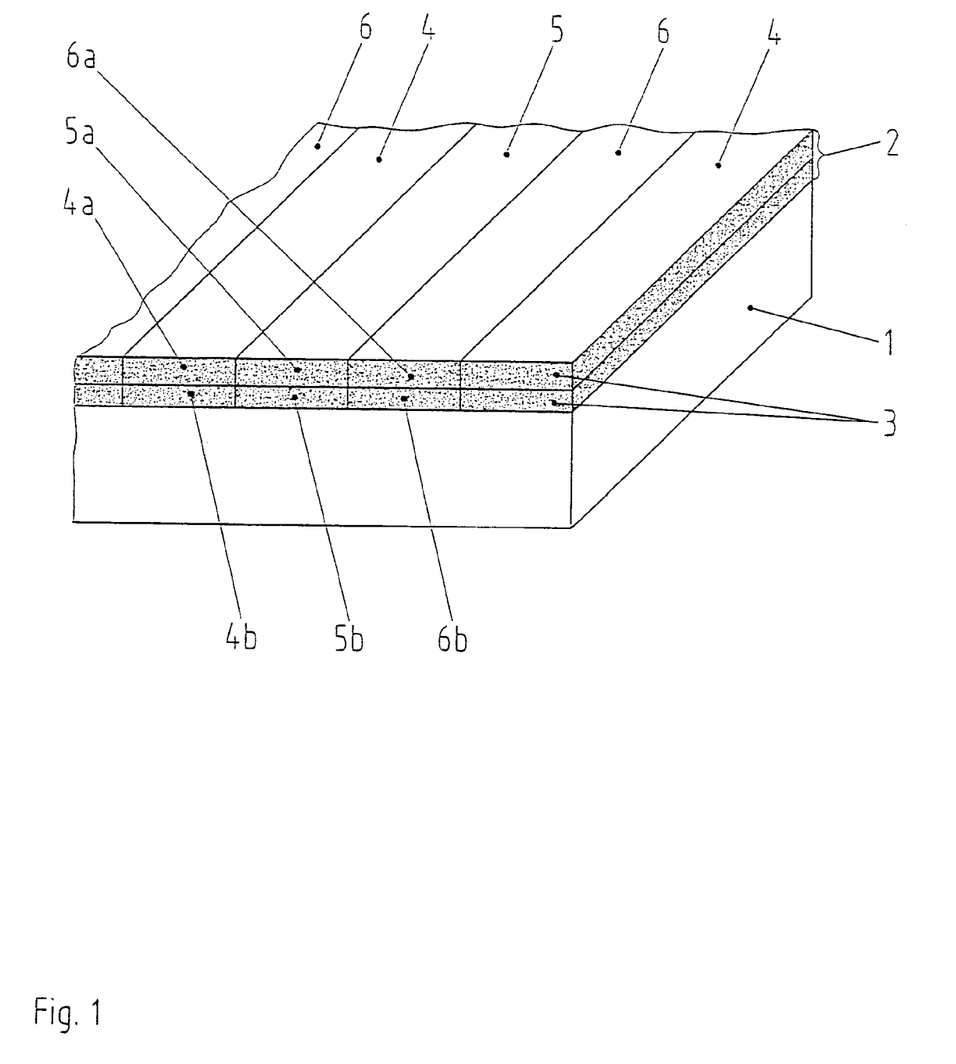
FIG. 1 shows a section of a multicolor dichroic polarizer according to the invention with strip-form image elements in a perspective, greatly enlarged section representation.

FIG. 1 shows a multicolor dichroic polarizer which comprises a sodium silicate glass substrate 1 that contains submicroscopic silver particles 3 in a surface layer 2 embodied as a double layer. The silver particles form spheroids that are described by their semiaxis ratio. The average dimensions of the spheroids are in the range of a few 10 nm. The silver particles are oriented by the production process with their main axes parallel to one another and parallel to the substrate surface.

In partial layers 4a and 4b, 5a and 5b, 6a and 6b lying one behind the other respectively, the axis ratios of the silver particles are adjusted so that they feature absorption bands in the blue and green, blue and red, or green and red spectral region respectively. As a result, when the substrate 1 is transilluminated with linearly polarized white light with a polarizing direction parallel to the large semiaxis of the particles, adjacent strips 4, 5, and 6 of the substrate 1 appear in the colors red, green, or blue respectively. The thickness of the partial layers 4a, 5a, and 6a bordering on the surface is the same and is fixed in accordance with the thickness of the surface layer 2 and the density- and size distribution of the particles within the surface layer 2.

Figure 2:
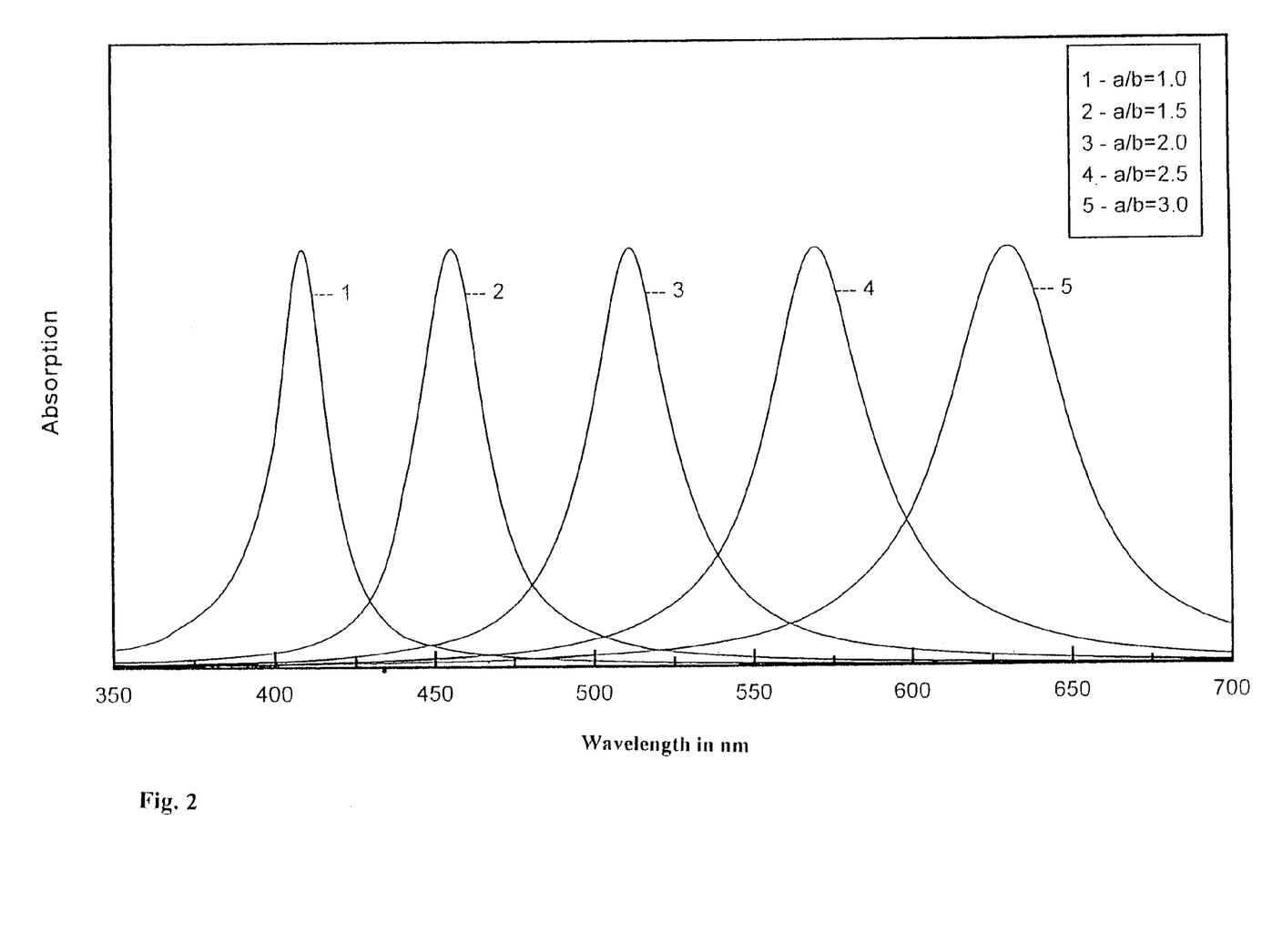
FIG. 2 shows an illustration of the relationship between the axis ratio of the silver particles and the spectral site of the assigned absorption bands.

With reference to FIG. 2, it can be seen that the non-spherical silver particles lead to a dichroic absorption effect, whereby the spectral maximum site of the absorption band is a function of the semiaxis ratio of the silver particles. A semiaxis ratio of the silver particles of a/b=3 results in a maximum site of the assigned absorption band in the red spectral region at 630 nm. With smaller axis ratios, the maxima of the corresponding absorption bands lie at smaller wavelengths. At an axis ratio close to 1, the absorption band lies in the blue spectral region at 420 nm.

Figure 3A:
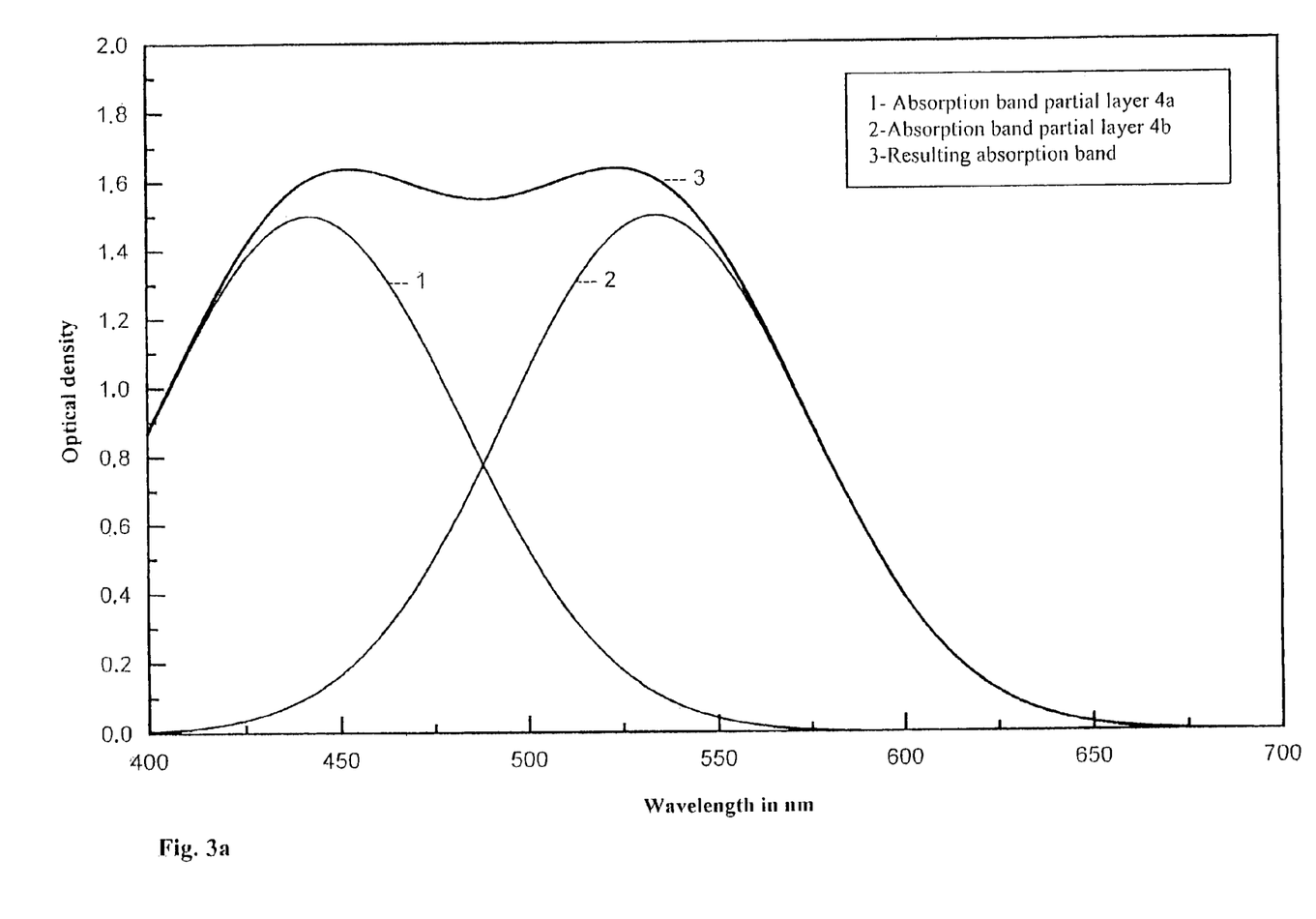
FIGS. 3a–c show absorption spectra adjusted in the double layers of different lateral regions of a multicolor dichroic polarizer to display the colors red (FIG. 3a), green (FIG. 3b), and blue (FIG. 3c).
Figure 3B:
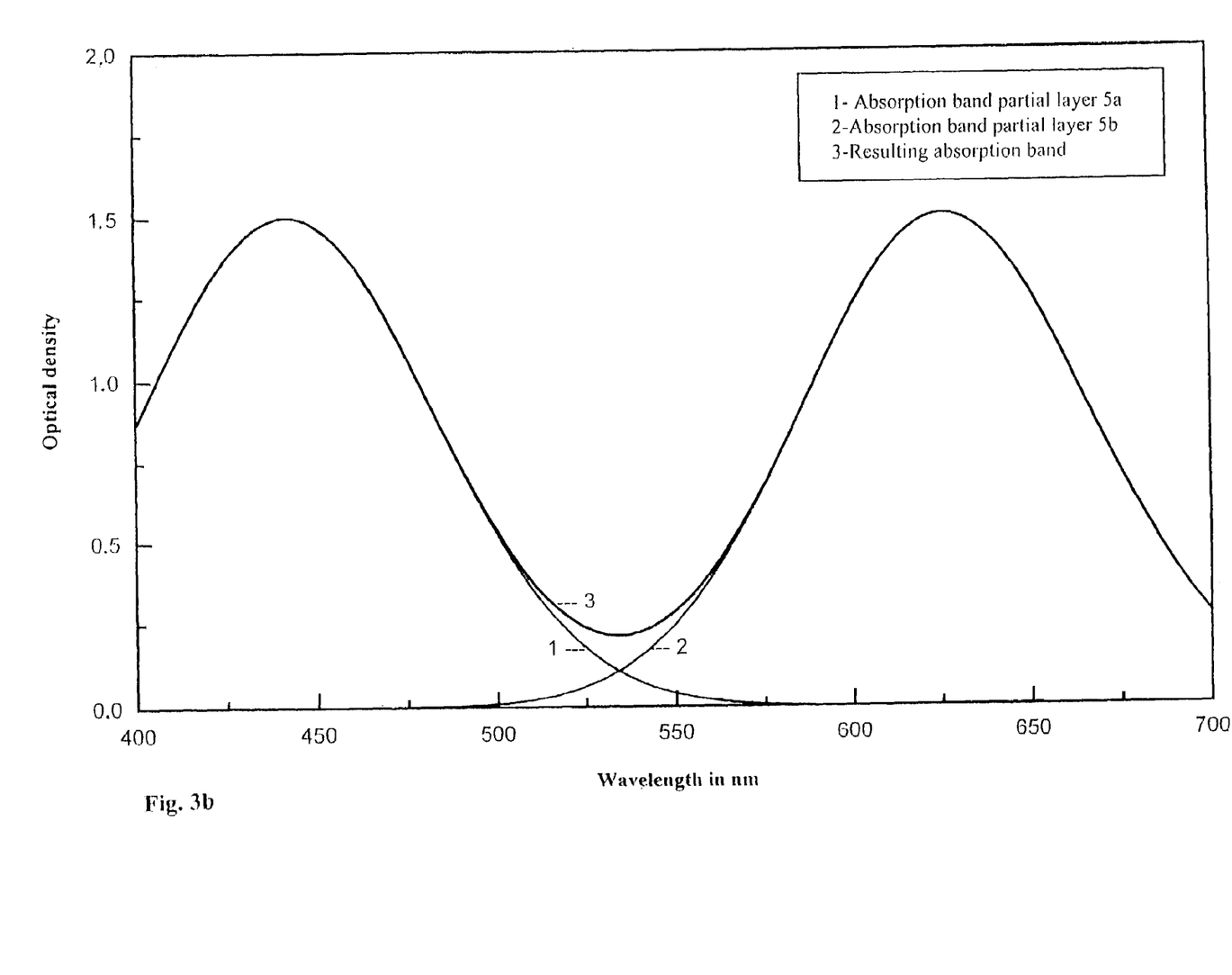
Figure 3C:
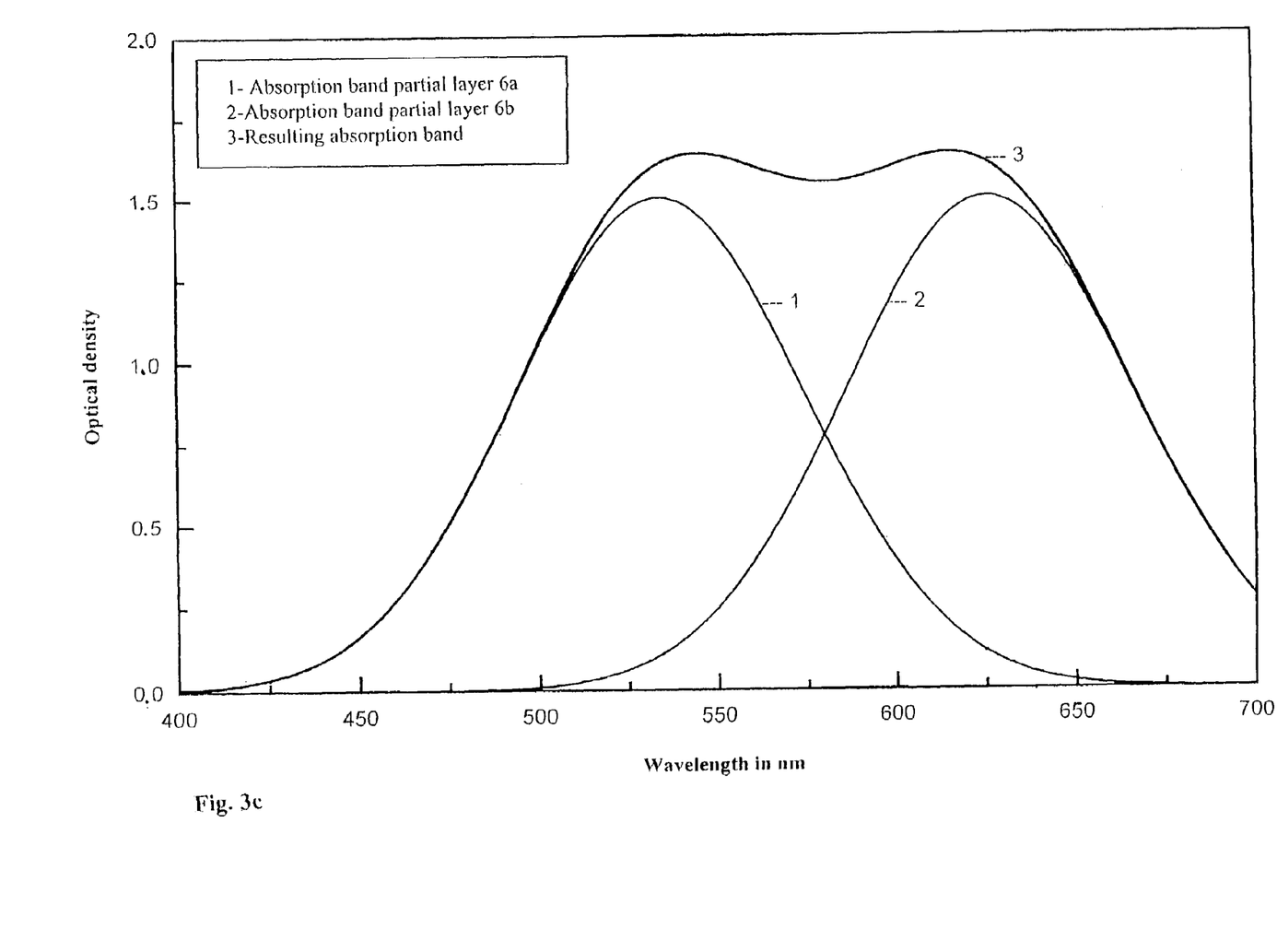

With reference to FIGS. 3a–c, it can be seen that the absorption spectrum of the surface layer 2 is formed in the individual adjacent strips 4, 5, and 6, respectively from the superimposition of the two absorption bands of the partial layers 4a; b, 5a; b, and 6a; b.

The method according to the invention for the production of the multicolor dichroic polarizer with colored image elements in the form of strips is described below. The starting point for the production of the multicolor dichroic polarizer with lateral surface regions in the form of strips in the colors red, green, and blue according to FIG. 1 is a glass substrate provided with silver particles in the entire region of the later double layer, the average semiaxis ratio of which silver particles causes an absorption band in the red spectral region. Then in a first process step, in the lateral regions 4, which are to appear red after the polarizer is finished, the substrate 1 is warmed with an electron beam by quasi-adiabatic energy transfer over the entire thickness of the surface layer 2—the later double layer—until the silver particles in these lateral regions relax over the entire thickness of the later double layer and until the absorption band shifts from the red spectral region into the green spectral region.

In a second process step, with an accelerating voltage of the electron beam lower than in the first process step, only the upper regions, which when the polarizer is finished form the upper partial layers 4a, 5a, and 6a of the double layer, are likewise warmed with the electron beam by quasi-adiabatic energy transfer until the absorption band in the partial layer 4a shifts from green to blue, in the partial layer 5a from red to blue, and in the partial layer 6a from red to green. The energy densities transferred to the individual strips 4, 5, and 6 are thereby selected in accordance with the temperature conditions required for the respectively needed spectral shift of the absorption bands.

For a typical thickness of the double layer of 10 to 20 μm, in the first process step an accelerating voltage for the electron beam of 50 to 70 kV is used, for the second process step an accelerating voltage of from <25 to 35 kV is used. The requirements for an adiabatic energy transfer are adequately met if this occurs for a given surface site within several microseconds up to several 10 microseconds, depending on the accelerating voltage of the electron beam.

To eliminate unavoidable slight non-uniformities, i.a., in the properties of the glass, the thickness of the surface layer and the particle distribution present therein, a process control may be necessary. The accelerating voltage of the electron beam is used thereby as an actuator to control deviations in the optical density, the transferred energy density is used as an actuator to control deviations in the spectral site of the absorption bands.

The invention claimed is:

1. A color dichroic polarizer comprising:
a glass substrate;
a surface layer; and
spheroidal metal particles arranged in the surface layer and being deposited in an oriented arrangement,
wherein, in at least one lateral region of the glass substrate, the surface layer comprises a double layer comprising two partial layers containing metal particles with different average axis ratios, and said two partial layers have different absorption spectra.

2. The color dichroic polarizer of claim 1, wherein the spheroidal metal particles comprise silver.

3. The color dichroic polarizer of claim 1, wherein the surface layer comprises a regular arrangement of strips.

4. The color dichroic polarizer of claim 1, wherein the surface layer comprises a regular arrangement of pixels.

5. The color dichroic polarizer of claim 1, wherein the surface layer comprises several lateral regions having the same absorption spectrum.

6. The color dichroic polarizer of claim 1, wherein the surface layer comprises strips arranged next to each other in a regular arrangement.

7. The color dichroic polarizer of claim 6, wherein some of the strips have one absorption spectrum and some other of the strips have another absorption spectrum.

8. The color dichroic polarizer of claim 1, wherein the surface layer comprises pixels arranged next to each other in a regular arrangement.

9. The color dichroic polarizer of claim 8, wherein some of the pixels have one absorption spectrum and some other of the pixels have another absorption spectrum.

10. The color dichroic polarizer of claim 1, wherein the surface layer comprises three strips arranged to produce an image element.

11. The color dichroic polarizer of claim 1, wherein the surface layer comprises groups of three strips, wherein each group is arranged to produce an image element, and wherein the image elements form a regular arrangement.

12. The color dichroic polarizer of claim 1, wherein the surface layer comprises three pixels arranged to produce an image element.

13. The color dichroic polarizer of claim 1, wherein the surface layer comprises groups of three pixels, wherein each group is arranged to produce an image element, and wherein the image elements form a regular arrangement.

14. The color dichroic polarizer of claim 1, wherein the surface layer comprises a group of one of pixels and strips arranged to produce image elements.

15. The color dichroic polarizer of claim 14, wherein the group comprises a first arrangement of pixels or strips having an absorption maxima in blue and green spectral region, a second arrangement of pixels or strips having an absorption maxima in blue and red spectral region, and a third arrangement of pixels or strips having an absorption maxima in the red and green spectral region, whereby, when the strips or pixels are illuminated with linearly polarized white light with a polarizing direction parallel to a large semiaxis of the spheroidal metal particles, the strips or pixels show red, green, and blue colors.

16. The color dichroic polarizer of claim 1, wherein each of the partial layers features an optical density that is greater than or equal to 1.

17. The color dichroic polarizer of claim 1, wherein the surface layer comprises a thickness in the range of between 10 μm and 20 μm.

18. The color dichroic polarizer of claim 1, wherein the partial layers have the same thickness.

19. The color dichroic polarizer of claim 1, wherein each of the partial layers has a thickness in the range of between 5 µm and 10 µm.

20. A process for producing a color dichroic polarizer comprising a glass substrate and a surface layer that contains in an oriented arrangement, spheroidal metal particles, and at least not totally relaxed metal particles in individual lateral regions, the process comprising:
    depositing, in an oriented arrangement and in partial regions of the surface layer, the spheroidal metal particles; and
    adjusting an axis ratio of the spheroidal metal particles in one partial layer of the surface layer by briefly warming the spheroidal metal particles in the one partial layer,
    wherein the axis ratio is smaller in the one partial layer than in another partial layer.

21. The process of claim 20, wherein the one partial layer comprises an outermost surface of the surface layer.

22. The process of claim 20, wherein the spheroidal metal particles in the individual lateral regions of the surface layer are not adjusted with regard to their axis ratio.

23. The process of claim 20, wherein the adjusting comprises causing the spheroidal metal particles to relax.

24. The process of claim 23, wherein the one partial layer comprises an outermost surface of the surface layer.

25. The process of claim 20, wherein the brief warming occurs by quasi-adiabatic energy transfer using an electron beam.

26. The process of claim 25, wherein a depth of penetration of the electron beam is matched to a thickness of the one partial layer using an accelerating voltage.

27. The process of claim 26, wherein the accelerating voltage of the electron beam is selected such that an electron range in the glass substrate is selected between two and three times the thickness of the one partial layer.

28. The process of claim 25, wherein the quasi-adiabatic energy transfer occurs in several partial amounts as a succession of pulses.

29. The process of claim 20, wherein the brief warming occurs with an electron beam and wherein an accelerating voltage of the electron beam is used as a regulating variable in a control process in order to ensure the same optical density of the partial layers.

30. The process of claim 29, wherein a transferred energy density is used as a regulating variable in the control process.

31. A method of making a color dichroic polarizer comprising:
    providing a glass substrate;
    applying a surface layer to the glass substrate, wherein the surface layer comprises a outer layer and an inner layer, wherein each of the outer and inner layers comprises a plurality of partial layers and includes spheroidal metal particles, and wherein the spheroidal metal particles comprise an average semiaxis ratio that causes an absorption band in a red spectral region;
    warming an entire thickness of the surface layer until the spheroidal metal particles relax over the entire thickness, whereby the absorption band in the red spectral region shifts to a green spectral region; and
    warming only the outer layer until (a) an absorption band of one of the partial layers shifts from green to blue, (b) an absorption band of another of the partial layers shifts from red to blue, and (c) an absorption band of still another of the partial layers shifts from red to green.

32. The process of claim 31, wherein the warming of the entire thickness comprises warming with an electron beam by quasi-adiabatic energy transfer using a first accelerating voltage.

33. The process of claim 32, wherein the warming of only the outer layer comprises warming with an electron beam by quasi-adiabatic energy transfer using a second accelerating voltage, the second accelerating voltage being lower than the first accelerating voltage.

34. The process of claim 33, wherein the second accelerating voltage is in the range of between less than 25 kV and 35 kV and wherein the first accelerating voltage is in the range of between 50 kV and 70 kV.

35. The process of claim 31, wherein the surface layer comprises a thickness of between 10 µm and 20 µm.

36. The process of claim 31, wherein each of the warming stages occurs within a time period of between several microseconds and 10 microseconds.

37. The process of claim 31, wherein the warming of only the outer layer comprises warming with an electron beam by quasi-adiabatic energy transfer using an accelerating voltage.

38. A color dichroic polarizer made by the process of claim 30.

* * * * *